Nov. 24, 1970     E. D. McCRORY, JR     3,541,670
METHODS FOR COATING SEPARATE MEMBERS TO BE JOINED
Filed Sept. 12, 1967
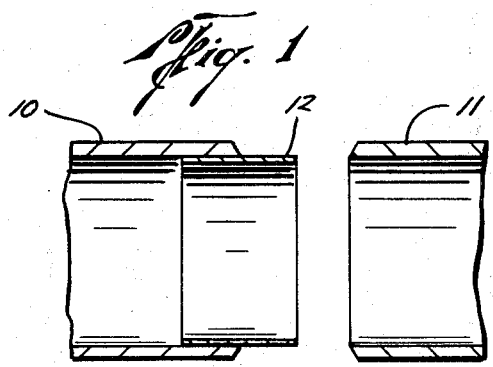
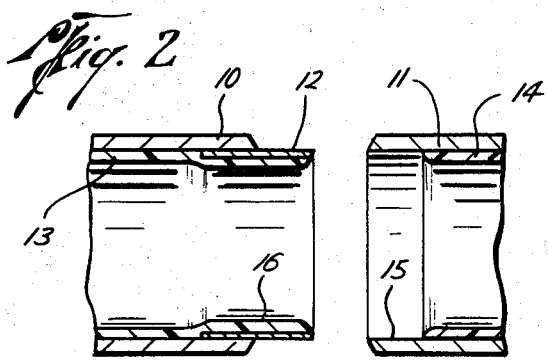
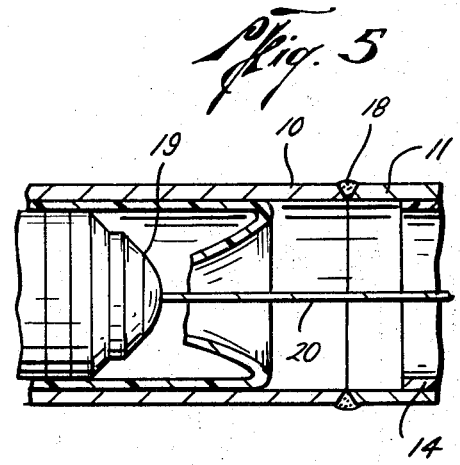
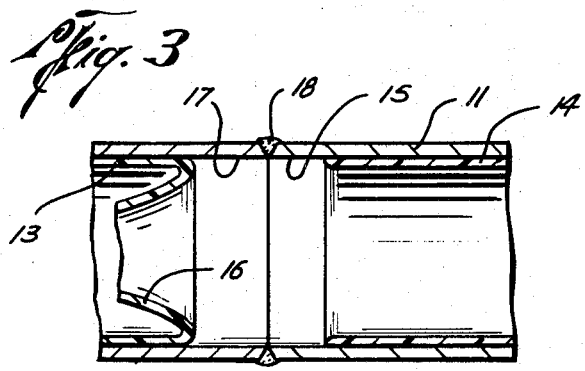
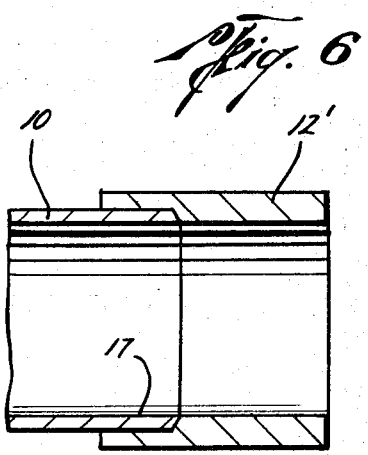
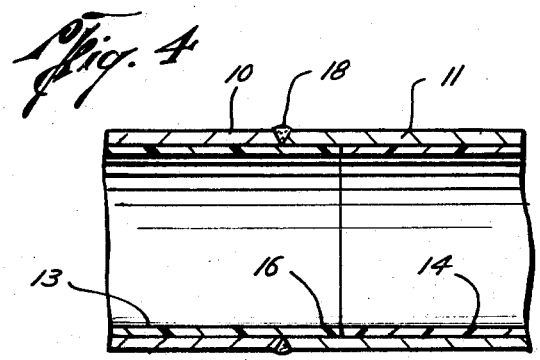
Edwin D. McCrory, Jr.
*INVENTOR.*
BY
*ATTORNEY*

United States Patent Office 3,541,670
Patented Nov. 24, 1970

3,541,670
METHODS FOR COATING SEPARATE MEMBERS TO BE JOINED
Edwin D. McCrory, Jr., Houston, Tex., assignor to Schlumberger Technology Corporation, Houston, Tex., a corporation of Texas
Filed Sept. 12, 1967, Ser. No. 667,199
Int. Cl. B23k 21/00
U.S. Cl. 29—471.1
22 Claims

ABSTRACT OF THE DISCLOSURE

The particular embodiments described herein as illustrative of various manners in which the invention may be practiced and the articles produced thereby are directed to provide a continuous protective coating between adjacent members. In one manner of accomplishing this with, for example, pipe sections to be joined together, an extension member is mounted on one end of each pipe section and the exposed surface adjacent to that end is protected to prevent coating material from sticking thereto. A thermoplastic coating material is applied to each section so as to leave an exposed surface adjacent to the other end of each section and continued across the protected exposed surface onto the extension. Once the coating material is cured, the extension is removed to leave a tubular cuff of the cured material projecting from the one end of each pipe section. After two or more of the pipe sections are joined, the tubular cuff is laid across the joint and joined to the coating material in the next pipe section.

---

Protective coatings are, of course, widely used in industry either to protect articles from their anticipated environments or else to prevent various substances from contacting the articles. It will be appreciated, however, that most typical protective coatings presently used are at least damaged, if not completely destroyed, by excessive heat. Consequently, where an article is to be both welded and coated, it has been necessary heretofore either to complete all welds on the article before coating it or else to repair those portions of a previously applied coating that are damaged by welding. Neither of these two alternatives are, of course, particularly satisfactory. For example, if an article is not coated until all welding is completed, some portions thereof may be so inaccessible that they cannot be adequately coated. On the other hand, it may be equally difficult to properly restore the damaged portions of the coating. In either case, unless skilled personnel are used, the resulting coating may not be of comparable quality. Moreover, since many coating materials require considerable heat for a substantial period of time, many coatings cannot be cured in the field.

Accordingly, it is an object of the present invention to provide new and improved methods for coating articles in such a manner that the coating will not be subsequently harmed by localized sources of heat such as by welding and the heated or welded portions can be thoroughly covered later.

As one example of how this and other objects of the present invention can be attained, two sections of pipe to be joined by welding are coated with a typical thick-film, thermoplastic coating, such as polyvinyl chloride, before these pipe sections are joined. On one pipe section, the coating is discontinued before reaching those portions thereof that may be exposed to deleterious temperatures during subsequent welding processes. On the other pipe section, however, the surfaces of those portions of this second section that may be subjected to extreme heat are first protected and the coating is then extended over these protected surfaces and continued therebeyond to form a flap of adequate size to at least reach the adjacent edges of the coating on the first-mentioned pipe section when the two sections are finally joined. Once the coatings are cured, the protector is removed and the resulting projecting flap is moved away from the uncoated surfaces so that the two pipe sections can be welded without damaging the coating on either piece. Then, the projecting flap is positioned over the previously uncoated surfaces of the two pipe sections and secured to the adjacent coating to provide a continuous covering over both sections and the weld joining them.

The novel features of the present invention are set forth with particularity in the appended claims. The operation, together with further objects and advantages thereof, may best be understood by way of illustration and example of certain embodiments when taken in conjunction with the accompanying drawings, in which:

FIGS. 1–4 are somewhat schematic views depicting the successive steps of one manner of practicing the methods of the present invention, with FIG. 4 showing a representative article of manufacture obtained thereby;

FIG. 5 shows one step of an alternative method of the present invention; and

FIG. 6 is a schematic view similar to FIG. 1 but showing an alternative device to be used in practicing the present invention.

Turning now to FIG. 1, to illustrate one manner in which the present invention may be practiced, the adjacent ends of two tubular members, such as sections of pipe 10 and 11, to be joined are shown. As is often the case, the service in which these pipe sections 10 and 11 are to be used requires that their internal surfaces be protected. Accordingly, as shown in FIG. 1, a close-fitting sleeve 12 is partially telescoped into the open end of the pipe section 10. To prevent the coating material from adhering to the sleeve 12, the sleeve is either made of a smooth metal or plastic to which the coating will not bond or else its internal surfaces are covered with a protective substance such as a petroleum or silicone compound that will withstand the temperatures expected during subsequent curing operations. For reasons that will subsequently become more apparent, it is necessary only to make the sleeve 12 of a material and thickness sufficient to provide a reasonably firm base on which a coating can be applied.

Once the sleeve 12 is in position, a thick-film thermoplastic material is applied, as by spraying, to the internal surfaces of the pipe sections 10 and 11 in such a manner as to leave a fairly thick coating, as at 13 and 14, on each pipe section as shown in a somewhat exaggerated form in FIG. 2. It will be appreciated, of course, that the thickness of the coatings 13 and 14 will depend upon the particular coating material being employed as well as upon the particular service anticipated. For example, where the coating material is polyvinyl chloride, the coatings 13 and 14 will typically have a cured thickness in the order of 20–125 mils. Similarly, where polyurethane is used, the coatings 13 and 14 may also have a cured thickness of about 20–125 mils. In any event, the particular coating thickness need only be sufficient to withstand a reasonable degree of handling.

Of particular significance, it should be noted from FIG. 2 that the coating 13 is applied in such a manner that it continues without interruption from the internal surface of the pipe section 10 onto the internal surface of the sleeve 12. On the other hand, the coating 14 on the internal surface of the pipe section 11 is terminated before reaching the end of the pipe. It will be further noted in FIG. 2 that the longitudinal length of the uncoated surface 15 on the pipe section 11 is substantially equal to the longitudinal length of that portion of the coating 13 extending beyond the end of the pipe section 10 and supported by the protective sleeve 12.

Once the coatings 13 and 14 are cured in accordance with the usual practice, the sleeve 12 is carefully removed to strip the coating 13 off of the protective sleeve without disturbing the integrity of the coating 13. In this manner, the outer extremity of the coating 13 forms a protruding sleeve or cuff 16 which initially extends beyond the end of the pipe section 10. It should be noted that the protruding cuff 16 is not bonded to the outermost internal surface 17 of the pipe section 10.

Accordingly, as best seen in FIG. 3, after the sleeve 12 has been removed, the cuff portion 16 of the coating 13 is turned back into the pipe section 10 so as to leave the outermost internal surface 17 thereof exposed. With the coating cuff 16 out of the way, the two ends of the pipe sections 10 and 11 are brought together and joined by a circumferential weld 18 in the usual manner. It will be recognized, however, that by not coating the surface 15 of the pipe section 11 and the corresponding surface 17 of the pipe section 10, the resulting heat from welding the joint at 18 will not extend to those portions of the coatings, 13 and 14 immediately adjacent thereto. Thus, the coatings 13 and 14 will be unaffected by the heat of the welding and the weld 18 can be made without damage to the coatings.

Turning now to FIG. 4, once a sufficient number of passes have been made to complete the weld 18 and the weld has cooled at least to a reasonable temperature, an adhesive is preferably applied to the exposed surfaces 15 and 17. Then, by reversing the coating cuff 16, it can be secured over the surfaces 15 and 17 so as to effect a complete junction between the coating 13 and the coating 14. Once this is finished, an effectively continuous and uninterrupted coating will be provided over all internal surfaces of the pipe sections 10 and 11. It will be recognized, however, that it is not essential to secure the coating cuff to the exposed surfaces 15 and 17 so long as the cuff 16 is secured to the adjacent coating 14 in such a manner as to provide a continuous seal thereto. It should also be noted that the seal between the coating cuff 16 and the adjacent coating 14 can also be accomplished by thermal bonding.

Although the reversal of the coating cuff 16 and bonding thereof can be accomplished in several ways, it is preferred, however, to manually perform these steps where the size of the pipes 10 and 11 are of a size (usually at least 18″–20″) that a man can efficiently work in. It will be appreciated, of course, that where at least one of the pipe sections 10 and 11 are fairly short or where the methods of the present invention are used to coat the external surfaces of pipe sections, no particular size limitations will be encountered.

When the pipe sections 10 and 11 are too small to permit entrance of a man, alternative procedures can be followed. For example, if the internal surfaces 15 and 17 are to be coated with an adhesive to secure the cuff 16, this adhesive can be applied by an elongated brush (not shown) or the like. Then, as seen in FIG. 5, a close-fitting expander member such as a swab cup 19 can be pulled by a cable 20 or the like through the pipe 10 into the pipe 11 to lay the cuff 16 into position over the exposed surfaces 15 and 17.

It will be appreciated that the sleeve 12 will leave a cuff 16 of slightly smaller diameter than the pipe sections 10 and 11. Accordingly, as shown in FIG. 6, to eliminate such diametrical differences, a sleeve 12′ having the same internal diameter as the pipe sections 10 and 11 can be slipped over the end of the pipe section 10. To prevent the coating 13 from initially bonding to the outermost internal surface 17, this surface can be coated with a suitable petroleum or silicone compound. The remainder of the procedure will, of course, be the same as already described.

The principles of the present invention can also be followed to coat the external surfaces of pipes (not shown). It will be appreciated, of course, that the protruding cuff (not shown) will be revised back along the exterior of the pipes. It should be noted also that a lubricant should be applied to the outside of the external cuff to facilitate its movement onto and off of the contiguous portion of the coating to which it is attached.

It should also be understood that the present invention can also be used to provide a continuous coating over adjacent welded sections of any configuration as, for example, in welded vessels. It should also be recognized that although welding has been described as the particular source of heat being avoided by the methods of the present invention, other sources of localized heat such as brazing or soldering could just as well be encountered.

Accordingly, it will be appreciated that the present invention has provided new and improved methods for coating articles requiring welding without risking damage to the coatings. By initially coating only the remote portions of articles to be welded and then, after the welding is completed, securing the free flap of cured coating material over the welded portions thereof, a new and improved article will be provided with all surfaces thereof covered as required to accomplish the desired protection.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for coating a member adapted for being fusion welded to another member and comprising the steps of: covering an exposed surface on a member contiguous to the intended welding junction thereof to another member to prevent a coating material from sticking to said surface when a coating material is applied thereto; mounting an extension on said member from said welding junction; applying a continuous pliable thermoplastic coating material to a portion of said member adjacent to said surface and on across said surface onto said extension; curing said thermoplastic coating material to provide a continuous pliable film that is bonded to said portion of said member and extends across said surface and onto said extension; and, thereafter, removing said extension to provide a free flap of said cured pliable film extending across said surface and beyond said welding junction which is adapted to be moved away therefrom as said member is being fusion welded to another.

2. The method of claim 1 wherein said thermoplastic material is substantially polyvinyl chloride.

3. The method of claim 1 wherein said thermoplastic material is substantially polyurethane.

4. The method of claim 1 further including the steps of: joining a second member to said first-mentioned member at said intended junction; and, thereafter, securing said free flap of cured pliable film in position over said surface and a portion of said second member adjacent to said junction between said members.

5. The method of claim 1 wherein said member and extension are tubular.

6. The method of claim 5 wherein said portion and said exposed surface are adjacent internal surfaces of said tubular member and said extension is partially telescoped into said member to accomplish the aforementioned covering of said exposed surface.

7. The method for joining tubular members and providing a continuous coating on such members comprising the steps of: applying a thermoplastic coating material to a first tubular member and terminating said coating material before reaching one end of said first tubular member to leave an exposed surface thereon contiguous to the intended junction of said first tubular member with another tubular member; covering the exposed surface on a second tubular member contiguous to one end of said second tubular member to prevent a coating material from sticking thereto when a coating material is applied to said second tubular member; mounting a tubular extension on said one end of said second tubular member; applying a thermoplastic coating material to said second tubular member and continuing said coating material across said covered surface thereon and onto at least a portion of said tubular extension; curing said thermoplastic coating materials; removing said tubular extension to provide a tubular cuff of said cured coating material extending across said exposed surface on said second tubular member and projecting from said one end thereof; joining said tubular members to one another at their respective said one ends; end, thereafter, securing said tubular cuff to said coating material on said first tubular member to provide a continuous coating over said exposed surfaces.

8. The method of claim 7 wherein said thermoplastic materials are substantially polyvinyl chloride.

9. The method of claim 7 wherein said thermoplastic materials are substantially polyurethane.

10. The method of claim 7 wherein said thermoplastic materials are applied to the internal surfaces of said tubular members.

11. The method of claim 10 wherein said tubular members and tubular extension have a circular cross-section and said tubular extension has an internal diameter substantially equal to that of said tubular members.

12. The method of claim 11 wherein said thermoplastic materials are substantially polyvinyl chloride.

13. The method of claim 11 wherein said thermoplastic materials are substantially polyurethane.

14. The method of claim 11 further including the step of securing said tubular cuff to said exposed surfaces before said tubular cuff is secured to said coating material on said first tubular member.

15. The method of claim 10 wherein said tubular members and tubular extension have a circular cross-section, said tubular extension has an external diameter slightly less than the internal diameter of said tubular members, and said tubular extension is partially telescoped into said one end of said second tubular member to accomplish the aforementioned covering of said exposed surface thereon.

16. The method of claim 15 wherein said thermoplastic materials are substantially polyvinyl chloride.

17. The method of claim 15 wherein said thermoplastic materials are substantially polyurethane.

18. The method of claim 15 further including the step of securing said tubular cuff to said exposed surfaces before said tubular cuff is secured to said coating material on said first tubular member.

19. The method of claim 7 wherein said thermoplastic materials are applied to the external surfaces of said tubular members.

20. A method for assembling a plurality of pipe sections in tandem and having a coating over all internal surfaces thereof comprising the steps of: covering the internal surface immediately adjacent to one end of each of a number of pipe sections to prevent a coating material from sticking thereto when a coating material is applied to said pipe sections; mounting a tubular extension on said one end of each of said pipe sections; applying a continuous thermoplastic coating material to the internal surface of each of said pipe sections between a location displaced from the other end of each of said pipe sections and a location on each of said tubular extensions beyond said one end of each of said pipe sections; curing said thermosplastic coating materials; removing each of said tubular extensions to provide a tubular cuff of said cured coating material extending across each of said covered surfaces and projecting from said one end of each of said pipe sections; welding said one end of one of said pipe sections to said other end of another one of said pipe sections; and securing said tubular cuff extending from said pipe section to said coating material on said other pipe section to provide a continuous coating between said one pipe section and said other pipe section.

21. The method of claim 20 further including the steps of: welding said one end of said other pipe section to said other end of a third pipe section; and securing said tubular cuff extending from said other pipe section to said coating material on said third pipe section to provide a continuous coating between said one, said other, and said third pipe section.

22. The method of claim 20 further including the step of: securing said tubular cuff to said one and said other pipe sections.

References Cited

UNITED STATES PATENTS 3,169,086   2/1965   Meissner.
3,461,009   8/1969   Snyder et al. _____ 156—293 X REUBEN EPSTEIN, Primary Examiner U.S. Cl. X.R.

117—48, 97; 156—158, 294